United States Patent [19]

Butts et al.

[11] Patent Number: 4,796,490

[45] Date of Patent: Jan. 10, 1989

[54] EVENT SEQUENCED CLUTCH-TO-CLUTCH DOWNSHIFT FOR AN ELECTRONICALLY CONTROLLED TRANSMISSION

[75] Inventors: Kenneth R. Butts, Grosse Pointe Woods; Joseph L. Wanamaker, Rochester, both of Mich.

[73] Assignee: General Motors Corporation, Detroit, Mich.

[21] Appl. No.: 136,417

[22] Filed: Dec. 22, 1987

[51] Int. Cl.$^4$ .............................................. B60K 41/18
[52] U.S. Cl. ............................................ 74/866; 74/877
[58] Field of Search ................................... 74/866, 877

[56] References Cited

U.S. PATENT DOCUMENTS

| | | | |
|---|---|---|---|
| 4,367,528 | 1/1983 | Kawamoto et al. | 74/866 X |
| 4,422,350 | 12/1983 | Müller et al. | 74/866 X |
| 4,485,443 | 11/1984 | Knödler et al. | 74/866 X |
| 4,653,350 | 3/1987 | Downs et al. | 74/866 X |
| 4,685,356 | 8/1987 | Iwatsuki | 74/866 |
| 4,690,017 | 9/1987 | Taniguchi et al. | 74/877 X |
| 4,707,789 | 11/1987 | Downs et al. | 74/866 X |
| 4,709,596 | 12/1987 | Boda et al. | 74/866 X |
| 4,730,519 | 3/1988 | Nakamura et al. | 74/866 |

*Primary Examiner*—Dirk Wright
*Attorney, Agent, or Firm*—Mark A. Navarre

[57] ABSTRACT

A clutch-to-clutch power-on downshift in a motor vehicle automatic transmission is initiated by reducing the torque capacity of the off-going clutch, permitting the transmission input speed to increase toward its post shift value. When the slippage across the off-going clutch exceeds a reference, the reduction of its torque capacity is suspended, permitting continued increase of the transmission input speed. When the slippage across the oncoming clutch falls below a reference value, the oncoming and off-going clutches are concurrently applied and released to complete the shift. The transmission input speed substantially achieves its post shift value at the time of such apply and release, resulting in reduced shift-related output torque disturbance.

5 Claims, 7 Drawing Sheets

|   | DRIVE 3 CLUTCH 84 | 4TH CLUTCH 82 | FORWARD CLUTCH 88 | 3RD CLUTCH 90 | 1ST/REV CLUTCH 116 | 2ND BAND 118 |
|---|---|---|---|---|---|---|
| 1 | ON | OFF | ON | OFF | ON | OFF |
| 2 | ON | OFF | ON | OFF | OFF | ON |
| 3 | ON | OFF | ON | ON | OFF | OFF |
| 4 | OFF | ON | ON | ON | OFF | OFF |
| R | ON | OFF | OFF | ON | ON | OFF |

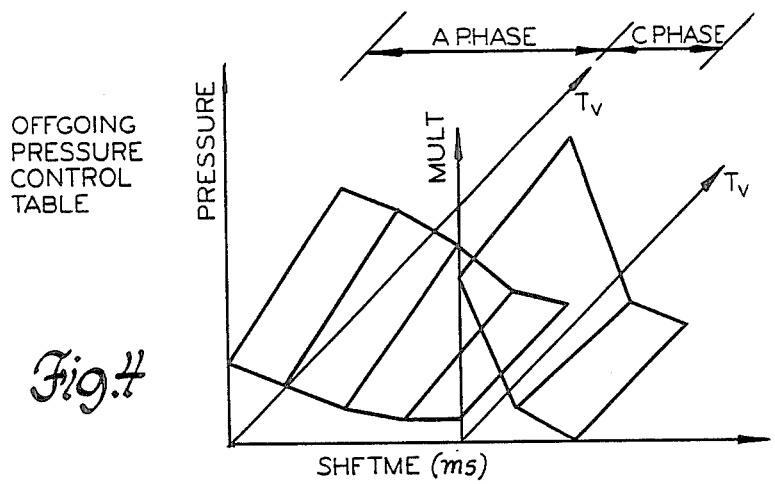
Fig. 4 OFFGOING PRESSURE CONTROL TABLE
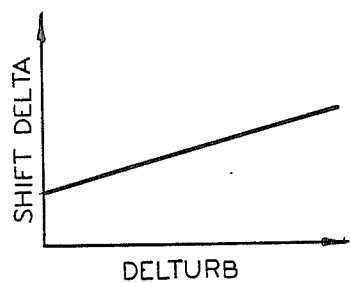
Fig. 5
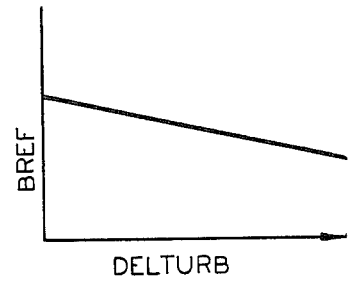
Fig. 6
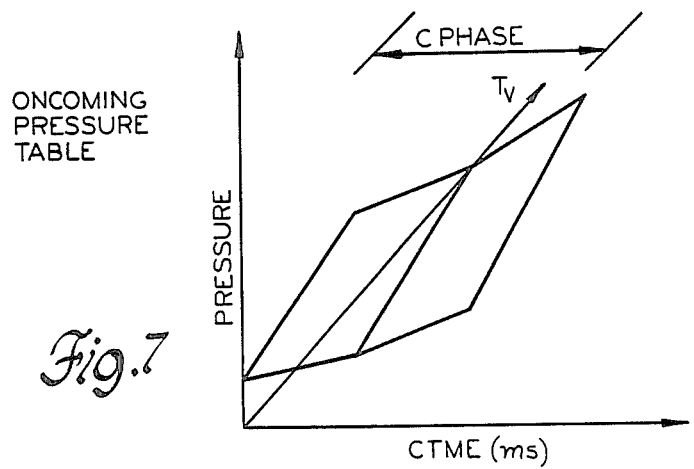
Fig. 7 ONCOMING PRESSURE TABLE

4,796,490

EVENT SEQUENCED CLUTCH-TO-CLUTCH DOWNSHIFT FOR AN ELECTRONICALLY CONTROLLED TRANSMISSION

This invention relates to clutch-to clutch speed ratio control in a motor vehicle automatic transmission, and more particularly to a system for effecting ratio downshifts when the vehicle is being operated in a positive torque or power-on mode.

BACKGROUND OF THE INVENTION

Generally, a motor vehicle automatic transmission includes a number of gear elements coupling its input and output shafts, and a related number of torque establishing devices, such as clutches and brakes, which are selectively engageable to activate certain gear elements for establishing a desired speed ratio between the input and output shafts.

The brake can be of the band type or disk type; engineering personnel in the automotive art refer to disc type brakes in transmissions as "clutches" or "reaction clutches". The input shaft is connected to the vehicle engine through a fluid coupling such as a torque converter and the output shaft is connected directly to the vehicle wheels. Shifting from one forward speed ratio to another is performed in response to engine throttle and vehicle speed, and generally involves releasing or disengaging the clutch or brake (off-going) associated with the current speed ratio and applying or engaging the clutch or brake (on-coming) associated with the desired speed ratio.

Shifts performed in the above manner, using clutches and/or reaction clutches, are termed clutch-to-clutch shifts. Shifts of this type present particular control difficulty in situations where a downshift to a lower speed ratio is required to accelerate the vehicle or maintain speed up a grade. Such downshifts typically involve relatively high transmission input torque and are referred to herein as power-on downshifts.

The control difficulty concerns the relative timing of the off-going release and the on-coming apply. If the on-coming clutch is applied before the off-going clutch is released, the clutches oppose each other and the output torque is sharply reduced; if the off-going clutch is released before the on-coming clutch is applied, the transmission is effectively shifted to neutral and the engine speed flares. Both situations degrade the shift quality and are highly undesirable.

The shift control is additionally complicated by the fact that the on-coming clutch must be pressurized, or filled, with hydraulic fluid before it has the capacity to transmit torque. For the reasons outlined above, automatic transmissions commonly include free-wheeling or one-way torque transmitting elements in series with a reaction clutch, which elements are capable of transmitting torque in one direction only. As the on-coming clutch is applied and begins to transmit torque, the free-wheeling or one-way device associated with the off-going clutch overruns, effectively releasing the off-going clutch. However, the one-way devices do not come without expense, and it is highly desirable to limit their usage in transmissions.

SUMMARY OF THE INVENTION

This invention is directed to a motor vehicle electronic transmission control system for achieving high quality clutch-to-clutch power-on downshifts without the use of free-wheeling or one-way torque transmitting elements. The electronic control is used to advantage through its ability to continuously monitor various engine and transmission operating parameters and precisely control the pressure supplied to the clutching devices involved in the shift.

Downshifting, according to this invention, is functionally divided into three phases: A, B and C. During the A-Phase, the torque capacity of the off-going clutch is progressively reduced and filling of the on-coming clutch is initiated in preparation for torque transmission. When the slippage of the off-going clutch exceeds a reference value chosen to provide adequate acceleration of the transmission input speed, the B-Phase of the shift is entered. In the B-Phase, the reduction of the off-going clutch torque capacity is suspended while the transmission input speed continues to rise. When the slip speed of the on-coming clutch falls below a reference value determined in relation to the engagement time thereof, the off-going and on-coming clutches are concurrently released and engaged, respectively, to complete the shift.

With the control of this invention, the transmission input speed substantially achieves its post shift value when the exchange of clutching devices occurs. As a result, the output torque disturbance due to the shift is reduced.

BRIEF DESCRIPTION OF THE DRAWINGS

FIGS. 4–7 graphically depict terms used in the generation of the clutch pressure commands according to this invention.

FIG. 8 is a main loop flow diagram; FIGS. 9 and 10a–10b are subroutine flow diagrams called by the main loop flow diagram.

DETAILED DESCRIPTION OF THE DRAWINGS

Figure 1:
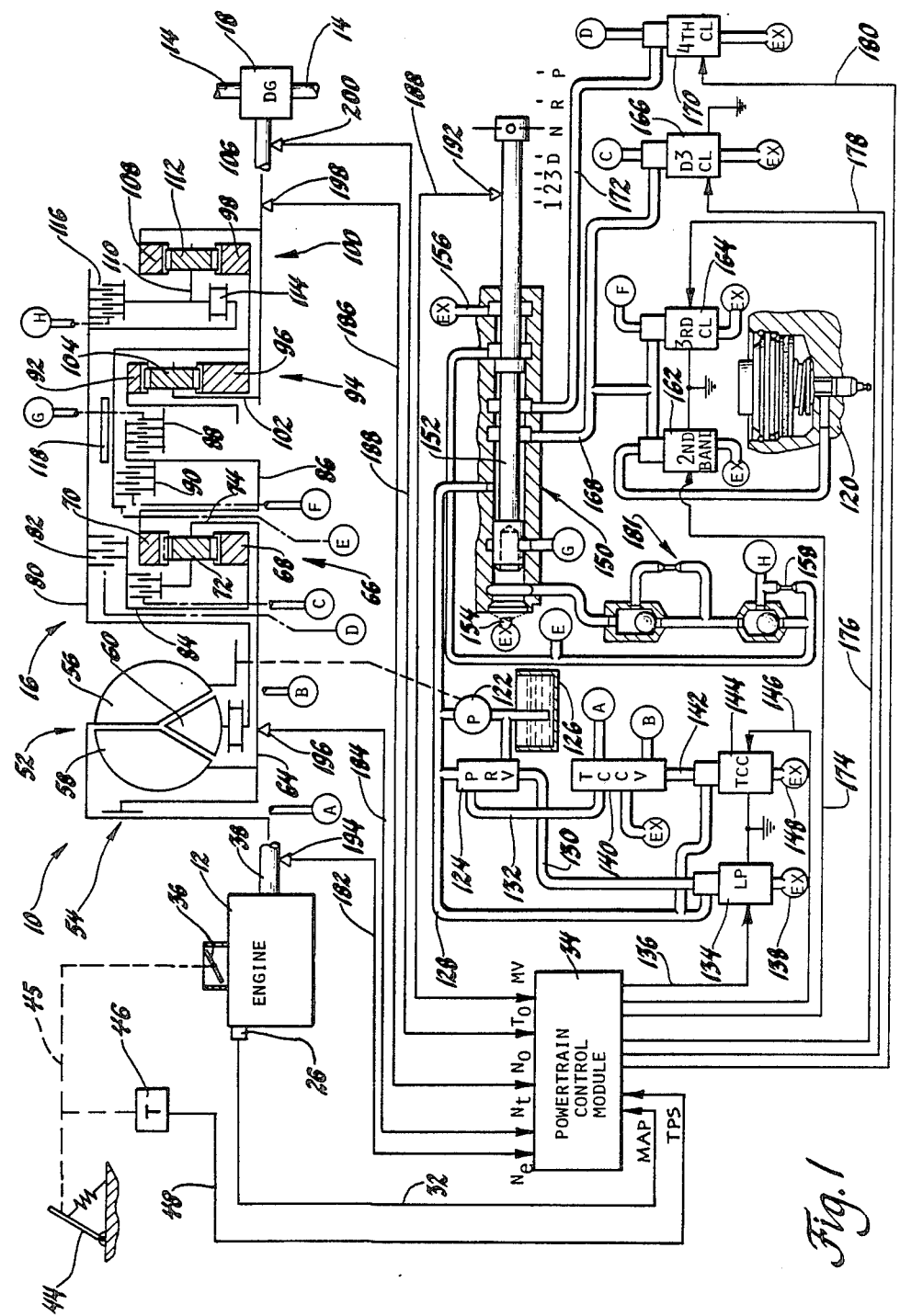
FIG. 1 schematically depicts a computer based electronic transmission control system according to the teachings of this invention.

Referring now to the drawings, and more particularly to FIG. 1, the reference numeral 10 generally designates a motor vehicle powertrain. The powertrain 10 comprises an internal combustion engine 12 having an output shaft 38 which drives a pair of vehicle prop shafts 14 through a stepped ratio automatic transmission 16 and a conventional differential gearset (DG) 18.

Engine 12 includes a throttle 36 for admitting combustion air and regulating the torque at its output shaft 38. The throttle 36 is positioned by an operator manipulated accelerator pedal 44, as indicated by the broken lines 45. A position transducer (T) 46 responsive to the linkage position generates an electrical signal (TPS) in accordance therewith on line 48. A pressure transducer 26 responsive to the internal engine pressure downstream of the throttle 36 (manifold absolute pressure MAP) generates an electrical signal in accordance therewith on line 32.

The transmission 16 includes a conventional torque converter 52 and torque converter clutch 54. The torque converter 52 has an impeller 56 driven by the engine output shaft 38, a turbine 58 and a stator 60. During torque converter operation, line A supplies fluid to the release side of clutch 54. The fluid is returned to a conventional cooler (not shown) via line B. During converter clutch operation, line B supplies fluid to the apply side of clutch 54. Any flow from the converter 52 is exhausted by line A.

The turbine 58 and torque converter clutch 54 are connected to a shaft 64 which is coupled with an overdrive planetary gearset, generally designated by the reference numeral 66. The planetary gearset 66 includes a sun gear 68, a ring gear 70, a plurality of planet gears 72 in meshing engagement with the sun and ring gears 68 and 70 and a planet carrier 74. The carrier 74 is connected to the shaft 64. The sun gear 68 is selectively connectible with the transmission housing 80 through a selectively engageable fluid-operated friction brake 82. A selectively engageable fluid clutch 84 connects the planet carrier 74 to the sun gear 68. When the brake 82 is engaged, and the clutch 84 disengaged, the planetary gearset 66 is conditioned for an overdrive ratio; when brake 82 is disengaged, the sun gear 68 freewheels and the transmission 16 is in Neutral. When the brake 82 is disengaged and the clutch 84 engaged, the sun gear 68 is connected to the planet carrier 74, which locks the planetary gearset 66 for a direct drive.

The ring gear 70 of gearset 66 is connected to a shaft 86 which acts as an input member for a pair of fluid-operated friction clutches 88 and 90. The clutch 88 is connected to a ring gear 92 of planetary gearset 94. The clutch 90 is connected to the sun gear 96 of the planetary gearset 94 and to the sun gear 98 of a planetary gearset 100.

The planetary gearset 94 includes a carrier 102 upon which are mounted a plurality of planet gears 104 in meshing engagement with the sun and ring gears 96 and 92. The carrier 102 is connected to the transmission output shaft 106.

The planetary gearset 100 includes a ring gear 108, a carrier 110, and a plurality of planet gears 112 rotatably mounted on the carrier 110 and in meshing engagement with the sun and ring gears 98 and 108. The ring gear 108 is connected to the output shaft 106, while the carrier 110 may be selectively connected with the transmission housing 80 by a one-way brake 114 or by a fluid-operated friction brake 116. The sun gears 96 and 98 are interconnected and selectively controlled by a fluid-operated friction band brake 118.

Figures 2, 3:
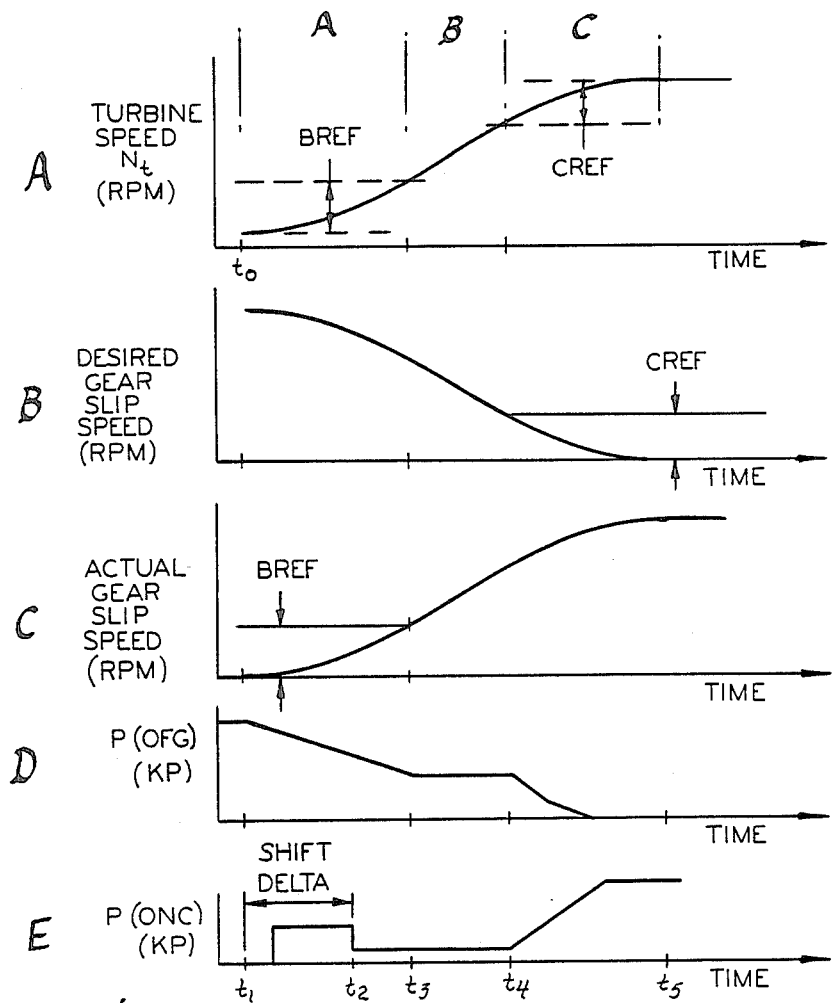
FIG. 2 is a chart depicting the schedule of clutch engagement for the transmission of FIG. 1.
FIG. 3 graphically depicts an event sequenced downshift performed in accordance with the teachings of this invention.

The fluid-operated devices 82, 84, 88, 90, 116 and 118 are selectively engageable in accordance with the friction element state table of FIG. 2 to provide four forward ratios (1st, 2nd, 3rd and 4th) and one reverse ratio (Rev). The brake 82 (referred to herein as 4th clutch) is supplied with fluid pressure via line D. The clutch 84 (referred to herein as D3, or Drive 3 clutch) is supplied with fluid pressure via line C. The clutch 88 (referred to herein as the forward clutch) is supplied with fluid pressure via line G. The clutch 90 (referred to herein as 3rd clutch) is supplied with fluid pressure via lines E and F. The pressure is supplied via line E to engage the reverse ratio, and via line F to engage the 3rd and 4th ratios. The brake 116 (referred to herein as 1st/REV clutch) is supplied with fluid pressure via line H. The brake 118 (referred to herein as 2nd band) is engaged by a conventional fluid-operated servo 120.

Three downshifts are possible: 2-1, 3-2, and 4-3. The 2-1 downshift merely requires release of the 2nd band 118; the on-coming torque establishing device is the one-way brake 114, which engages automatically. The 3-2 downshift requires concurrent engagement of the 2nd band 118 and release of the 3rd clutch 90. The 4-3 downshift requires concurrent engagement of the D3 clutch 84 and release of the 4th clutch 82.

The fluid supply elements for the transmission 16 include a conventional variable displacement pump (P) 122 driven by the impeller 56 of torque converter 52 and a pressure regulator valve (PRV) 124. The pump 122 draws hydraulic fluid from a reservoir 126 and delivers pressurized fluid to the line pressure passage 128. Line 128 is connected to PRV 124, which operates in response to a pilot pressure in line 130 to regulate the fluid pressure therein by returning a variable portion of the fluid to the reservoir 126. In addition, the PRV 124 provides a second regulated fluid pressure in line 132 (hereinafter referred to as converter feed pressure). The pilot pressure in line 130 is obtained from the line pressure solenoid valve 134, which is pulse-width-modulated by the powertrain control module 34 via line 136 to alternately connect line 130 with line pressure in line 128 or with the exhaust line 138. The duty cycle of pulse-width-modulation thereby controls the line pressure in line 128 and the converter feed pressure in line 132.

The converter feed pressure in line 132 is applied to the torque converter control valve (TCCV) 140, which operates in response to a pilot pressure in line 142 to selectively direct converter feed pressure to line A or line B. The pilot pressure in line 142 is obtained from the torque converter clutch solenoid valve 144, which is controlled by the powertrain control module 34 via line 146 to selectively connect line 142 with line pressure in line 128, or the exhaust line 148. The solenoid valve 144 is normally operative to bias the TCCV 140 such that converter feed pressure in line 132 is directed to line A, and line B is exhausted to the cooler. In such state, the clutch 54 is released, and torque converter operation is achieved. However, when it is desired to engage the clutch 54, the solenoid valve 144 is energized to bias the TCCV 140 such that converter feed pressure in line 132 is directed to line B, and line A is exhausted to the cooler.

Line pressure is also supplied to a manual valve 150, the spool 152 of which is adapted to receive linear mechanical input from the operator of the vehicle via a suitable linkage (not shown). The spool 152 is positioned by the operator to select the desired operation of transmission 16 as set forth by the designations P, R, N, D, 3, 2 and 1, which correspond to Park, Reverse, Neutral, Drive, 3rd, 2nd and 1st, respectively. In turn, the manual valve 150 distributes the line pressure to the various output passages C - H according to the spool position.

In FIG. 1, spool 152 is positioned in relation to the N, or Neutral, indication. In such case, the forward clutch 88 is exhausted via passage G and exhaust line 154 and the reverse clutch 116 is exhausted via passage H and exhaust line 156. Line pressure is supplied to the solenoid valves 162, 164, 166 and 170 via the lines 168 and 172. When the spool 152 is shifted to the D or drive position, line pressure is also supplied to the forward clutch 88 via passage G. The 2nd band solenoid valve 162 is pulse-width-modulated by the powertrain control module 34 via line 174 to control the band apply pressure exerted by the fluid-operated servo 120. The 3rd clutch solenoid valve 164 is pulse-width-modulated by the powertrain control module 34 via line 176 to control the apply pressure of 3rd clutch 90. The D3 clutch solenoid valve 166 is pulse-width-modulated by the powertrain control module 34 via line 178 to control the apply pressure of the D3 clutch 84. The 4th clutch solenoid valve 170 is pulse-width-modulated by the powertrain control module 34 via line 180 to control the apply pressure of the 4th clutch 82. The valving arrangement, designated generally by the reference numeral 181, performs 1st/REV timing logic.

A computer based transmission control unit 34 receives the engine related input signals TPS and MAP via lines 48 and 32 and various other transmission related inputs via lines 182-188. An engine speed input signal $N_e$ is provided on line 182, a turbine speed input signal $N_t$ is provided on line 184, a transmission output speed input signal $N_o$ is provided on line 186, and a manual valve position signal MV on line 188. The various input signals are obtained using conventional transducer technology. The position signals on lines 48 and 188 are obtained with conventional potentiometers 46 and 192; the pressure signal on line 32 is obtained with a conventional pressure transducer; and the speed signals on lines 182-186 are obtained with conventional variable reluctance magnetic pickups 194-198. Obviously other sensor technologies could be used.

The transmission control unit 34 includes conventional computer elements including a microcomputer, memory elements for storing operating instructions and data, A/D converter elements for conditioning various analog inputs, and input/output elements for receiving and sending the various input and output signals. The control unit 34 operates as described below to control the operation of the various solenoid-operated valves of transmission 16 via lines 136, 146, 174, 176, 178 and 180. Flow diagrams representative of computer programs executed by the microprocessor of control unit 34 in carrying out such control are given in FIGS. 8, 9, and 10a-10b.

Transmission operating parameters are graphically depicted on a common time base as they would occur in the course of an event sequenced downshift according to this invention in Graphs A-E of FIG. 3. Graph 3A depicts the turbine speed $N_t$; Graph 3B depicts the desired gear slip speed DSLPSPD; Graph 3C depicts the actual gear slip speed ASLPSPD; Graph 3D depicts the pressure command P(OFG) for the off-going clutching device; and Graph 3E depicts the pressure command P(ONC) for the on-coming clutching device. As set forth in the graphs, an event sequenced downshift according to this invention is functionally divided into three phases: A, B and C. Additionally, the designations $t_0$–$t_5$ appear on the time axes to facilitate the description of the sequence of events in the downshift.

Prior to time $t_0$, a relatively high speed ratio, THIRD for example, is engaged. Accordingly, the pressure command P(OFG) for the active (off-going) clutch 90 is maintained at a relatively high steady state value as seen in Graph 3D. Such pressure command is obtained from a predetermined and torque dependent schedule designed to substantially prevent clutch slippage.

At time $t_0$, the control unit 34 commands a 3-2 downshift, marking the beginning of the A-Phase as designated in FIG. 3. In the A-Phase of the shift, the pressure command P(OFG) for the off-going clutch 90 is progressively reduced according to the predetermined torque and time dependent schedule of FIG. 4, as seen in Graph 3D. The pressure schedule shown in FIG. 4 is matched to the steady state pressure schedule referred to above so that the initial pressure command P(OFG) obtained from the A-Phase portion of FIG. 4 (at time $t_0$) corresponds with the steady state pressure command in effect prior to the shift.

The on-coming clutch engagement mechanism (band servo 120) is also filled or prepared for torque transmission during the A-Phase of the shift. The relation between the initiation of the off-going clutch pressure reduction (time $t_0$) and the start of fill (time $t_1$) is governed by a term referred to herein as SHIFT DELTA. The term SHIFT DELTA is defined as the interval ($t_1-t_0$), and is scheduled as a function of the turbine speed change DELTURB expected to occur during the shift. This, in turn, is calculated at the initiation of the shift in relation to the turbine speed AGINPSPD in effect at the start of the shift, the output speed $N_o$ and the speed ratio defined by the desired gear. The relation between the terms SHIFT DELTA and DELTURB is empirically determined, as graphically depicted in FIG. 5, so that the on-coming clutch is filled and prepared for engagement by the time the turbine speed is within a reference amount CREF of its postshift value DGINPSPD. When the on-coming clutch is filled, the pressure command P(ONC) is reduced to a low level $P_{lo}$, as indicated at time $t_2$, sufficient only to maintain the on-coming clutch prepared for engagement.

With the reduction in the pressure command P(OFG), the clutch 90 begins to slip as seen by the actual (old) gear slip speed ASLPSPD in Graph 3C. This enables the engine 12 to increase the turbine speed $N_t$ as seen in Graph 3A. When the actual gear slip speed ASLPSPD exceeds a reference slip level BREF at time $t_3$, the A-Phase of the shift is ended and the B-Phase begun. The reference slip level BREF is empirically determined in relation to the change DELTURB in turbine speed during the shift, as graphically depicted in FIG. 6, so that the consequent rate of change in turbine speed is within a predetermined acceleration range at the onset of the B-Phase. Alternately, the reference BREF may be defined as a specified amount of turbine speed increase, as indicated in Graph 3A.

In the B-Phase of the shift, the reduction of the pressure command P(OFG) for the clutch 90 is suspended, as seen in Graph 3D. This allows the turbine speed $N_t$ to continue increasing as seen in Graph 3A. Referring to the off-going pressure schedule of FIG. 4, the B-Phase pressure command P(OFG) is obtained by freezing the time variable SHFTME at the A-Phase-to-B-Phase transition. Thus, the pressure command P(OFG) retains its torque dependency, but does not decrease with time spent in the B-Phase.

As the turbine speed $N_t$ increases during the B-Phase of the shift, the desired gear slip speed DSLPSPD decreases, as seen in Graph 3B. A slip speed of zero indicates synchronization of the turbine speed $N_t$ with the desired gear. At time $t_4$, the slip speed falls below a reference speed CREF, signaling the end of the B-Phase and the beginning of the C-Phase. The reference CREF may alternately be defined as a specified amount of remaining turbine speed increase, as indicated in Graph 3A.

In the C-Phase of the shift, the pressure command P(OFG) is progressively reduced to release the off-going clutch 90 as seen in Graph 3D, and the pressure command P(ONC) is progressively increased to engage the on-coming band 118 as seen in Graph 3E. The pressure command P(OFG) is reduced in accordance with the schedule graphically depicted in the C-Phase region of FIG. 4. As indicated in that Figure, the schedule provides a multiplier MULT for the pressure command in effect during the B-Phase of the shift. The multiplier starts at unity and decreases to zero with elapsed time SHFTME. The pressure command P(ONC) is increased in accordance with the schedule graphically depicted in FIG. 7 as a function of the input torque variable $T_v$ and the time spent in the C-Phase CTME. The shift is complete when the pressure commands P(OFG) and P(ONC) reach their final values.

Figure 8:
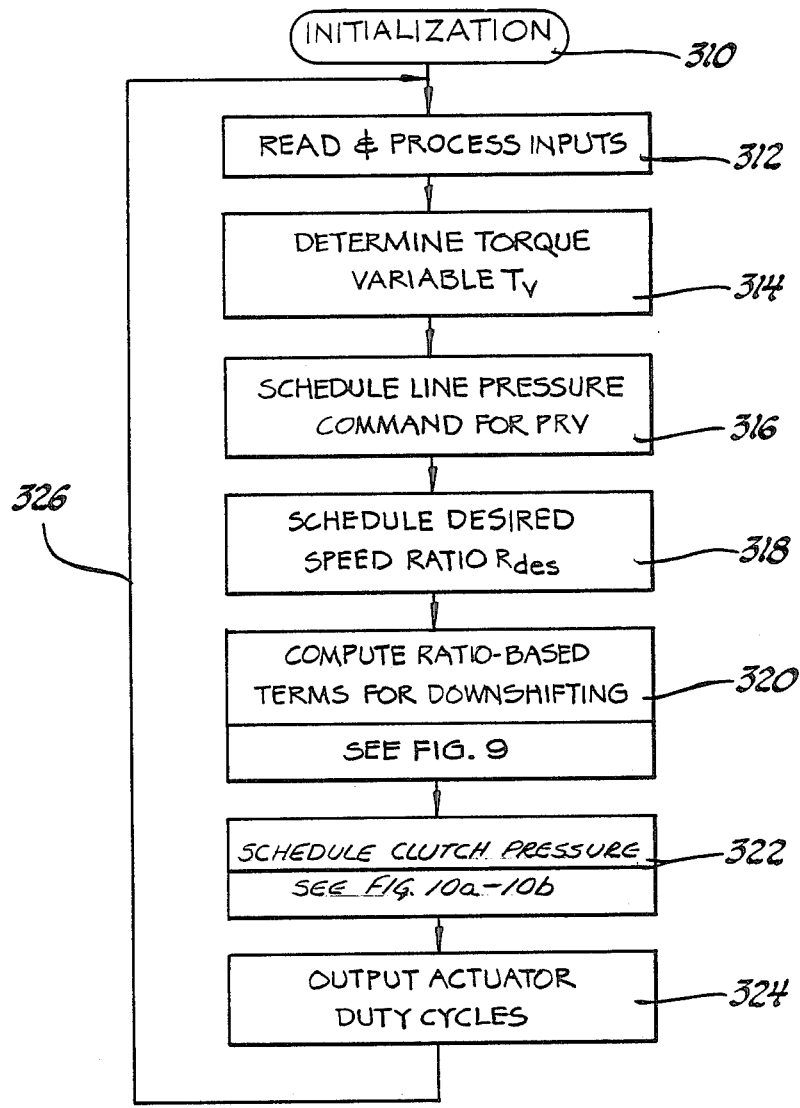
FIGS. 8, 9 and 10a–10b depict flow diagrams representative of suitable program instructions executed by the computer based controller of FIG. 1 for carrying out the control functions of this invention.
Figure 9:
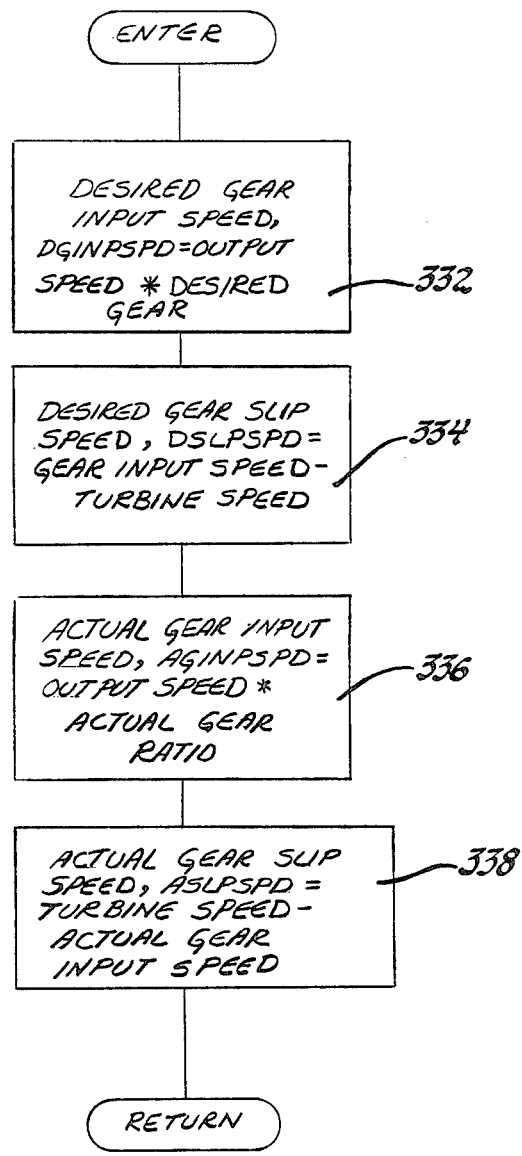
Figure 10A:
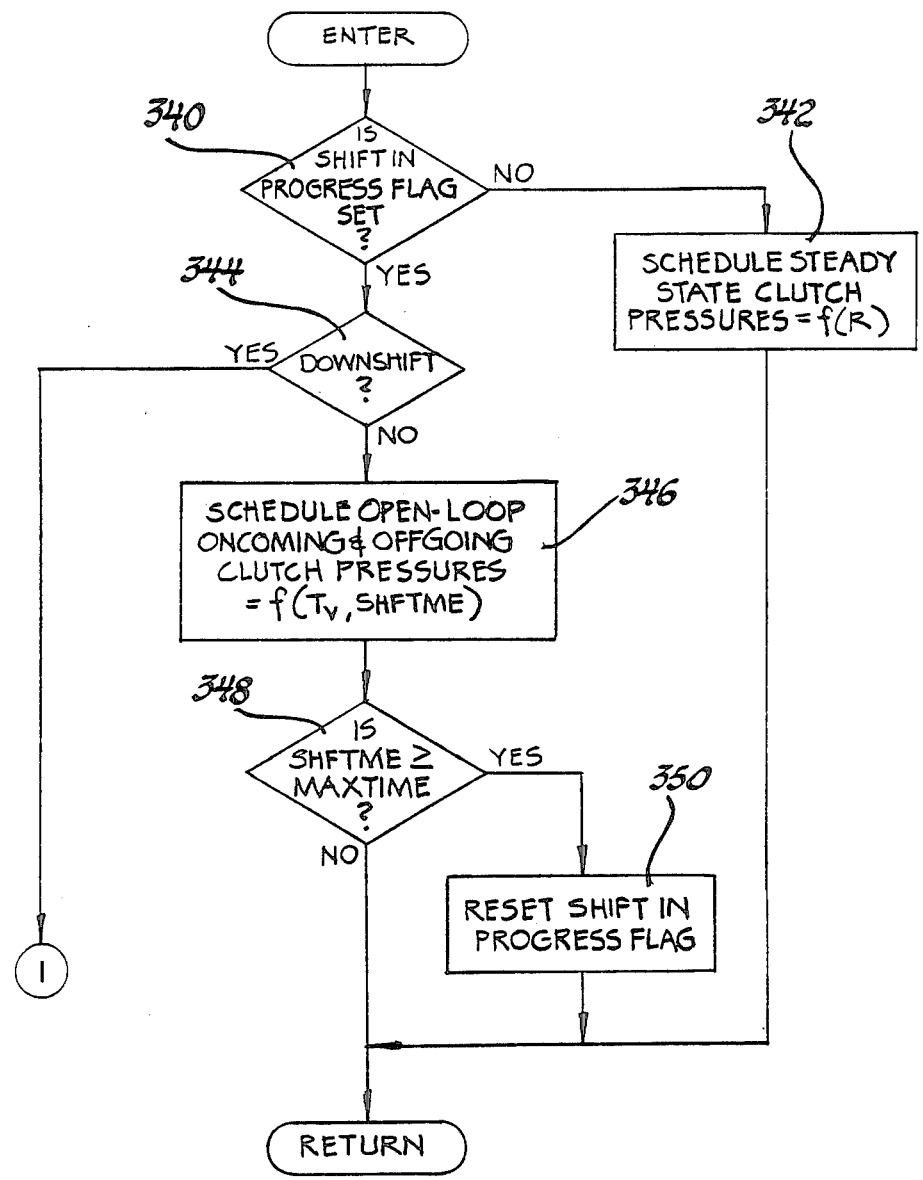
Figure 10B:
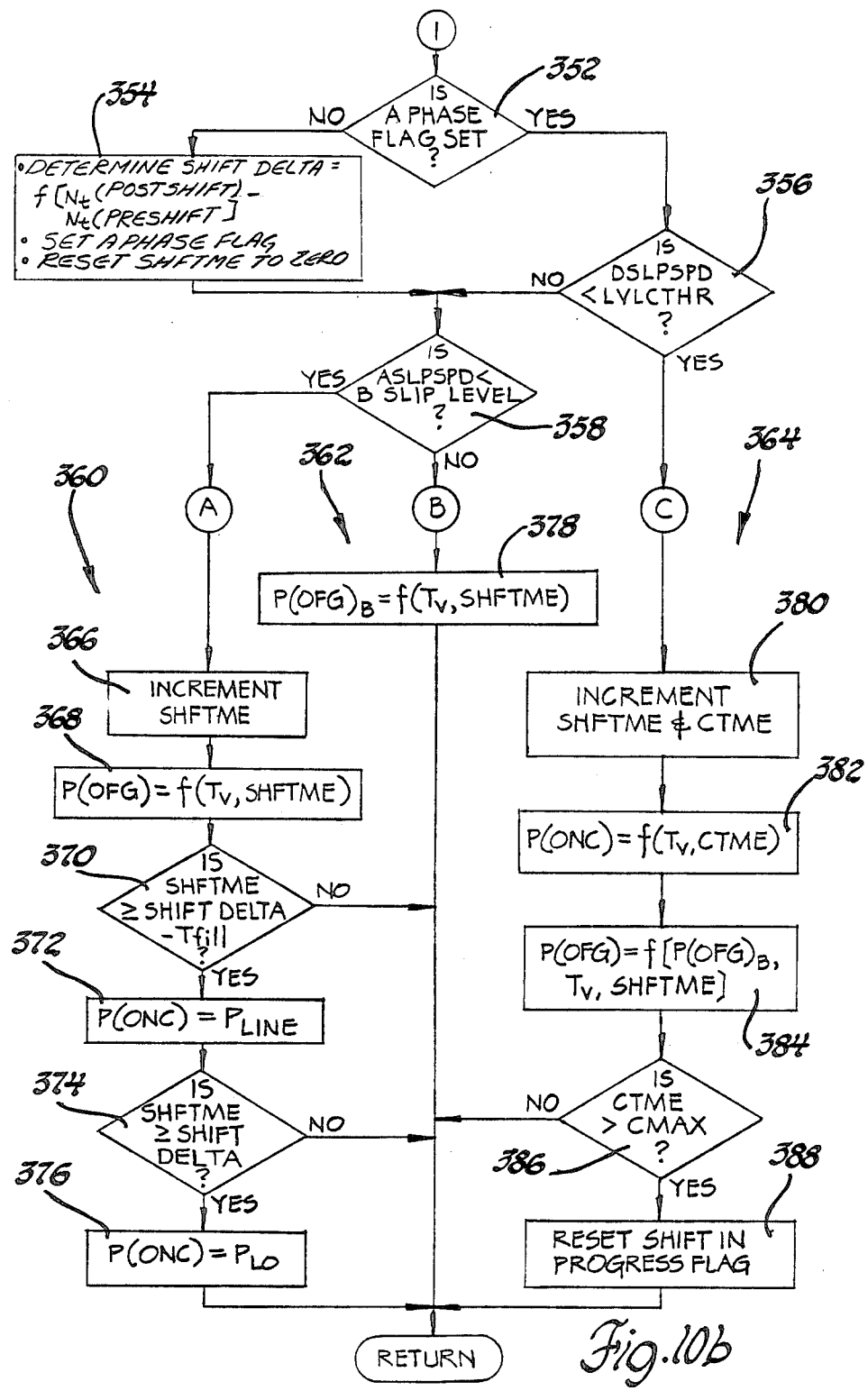

FIGS. 8, 9 and 10a–10b depict flow diagrams representative of computer program instructions executed by the microcomputer based transmission control unit 34 of FIG. 1 in carrying out the control functions of this invention. FIG. 8 depicts a main loop or executive program setting forth the major steps of the control. FIGS. 9 and 10a–10b depict various of such steps in detail.

Referring now to the flow diagram of FIG. 8, the reference numeral 310 generally designates a series of instructions executed at the initiation of each period of vehicle operation for initializing the various timers, registers and variables of the powertrain control module 34. Following such initialization, the instruction blocks 312–324 are repeatedly executed in sequence as designated by the flow diagram lines connecting such instruction blocks and the return line 326. Instruction block 312 serves to read and condition the various input signals applied to I/O device 300 via the lines 272–284, and updates (increments) various control unit timers. Instruction block 314 calculates various terms used in the control algorithms, including the torque variable $T_v$. An algebraic expression which may be used to calculate the term $T_v$ is given in the Downs et al. U.S. Pat. No. 4,653,350, issued Mar. 31, 1987, which application is assigned to the assignee of the present invention.

Instruction block 316 schedules a line or operating pressure command for the pressure regulator valve PRV in accordance with the torque variable $T_v$, and the instruction block 318 determines the desired speed ratio, $R_{des}$. The desired speed ratio $R_{des}$ may be determined in accordance with a number of inputs including throttle position, vehicle speed and manual valve position. In transmission control, this function is generally referred to as shift pattern generation.

Instruction block 320 determines various ratio-based terms used in connection with the event sequenced downshift control of this invention, and instruction block 322 determines the clutching device pressure commands for effecting a ratio shift, if required. The pressure commands for nonshifting clutching devices are also determined. Expanded descriptions of the instruction blocks 320 and 322 are given in the flow diagrams of FIGS. 9 and 10a–10b, respectively, as indicated.

Instruction block 324 converts the clutching device and PRV pressure commands to PWM duty cycles based on the operating characteristics of the various actuators (empirically determined), and energizes the actuator coils accordingly.

In the flow diagram of FIG. 9, the instruction blocks 332–338 are executed in sequence to determine various ratio-based terms used in connection with the event sequenced downshift of this invention. The desired gear input speed is computed at instruction block 332 according to the product of the output speed $N_o$ and the speed ratio of the desired ratio $R_{des}$. The desired gear slip speed DSLPSPD is computed at instruction block 334 according to the difference of the desired gear input speed and the turbine speed $N_t$. The actual (old) gear input speed is computed at instruction block 336 according to the product of the output speed $N_o$ and the speed ratio of the present (old) ratio R. The actual (old) gear slip speed ASLPSPD is computed at instruction block 338 according to the difference between the turbine speed $N_t$ and the actual gear input speed completed at block 336.

Referring now to the clutch pressure scheduling flow diagram depicted in FIGS. 10a–10b, the decision block 340 is first executed to determine if the SHIFT IN PROGRESS flag is set. This flag is set by the desired ratio scheduling routine, described in reference to block 318 of the main flow diagram of FIG. 8, whenever the desired ratio $R_{des}$ differs from the actual (present) ratio R. As indicated below, the SHIFT IN PROGRESS flag is reset at the completion of the commanded shift.

If the SHIFT IN PROGRESS flag is not set, the instruction block 342 is executed to schedule the steady state clutch pressures so as to maintain engagement of the currently established ratio R, completing the routine.

If the SHIFT IN PROGRESS flag is set, the decision block 344 is executed to determine if the required shift is a downshift. If not, an upshift is required and the instruction block 346 is executed to schedule the on-coming and off-going clutch pressures P(ONC) and P(OFG) as an open-loop function of the torque variable $T_v$ and the elapsed time of the shift, designated by the term SHFTME. When the term SHFTME exceeds a reference, MAXTIME, indicative of shift completion, as determined at decision block 348, the instruction block 350 is executed to reset the SHIFT IN PROGRESS flag. If the required shift is a downshift, the flow diagram set forth in FIG. 10b is executed to carry out an event sequenced downshift according to this invention, as indicated by the circled numeral 1.

Referring now to the event sequenced downshift routine flow diagram depicted in FIG. 10b, the decision block 352 is first executed to determine if the A PHASE flag is set. If not, the shift is just starting and the instruction block 354 is executed to initialize the term SHIFT DELTA, defined above in reference to Graph 3E, to set the A PHASE flag and to reset the elapsed shift time term SHFTME. In the course of the shift, the decision block 352 will thereafter be answered in the affirmative, signaling the execution of decision block 356. The decision block 356 determines if the desired gear slip speed DSLPSPD is less than a synchronization level threshold LVLCTHR defined above in reference to Graph 3A. Initially, the decision block 356 will be answered in the negative, signaling the execution of decision block 358. The decision block 358 determines if the actual (present) gear slip speed ASLPSPD is less than the B phase slip level speed reference, BREF, defined above in reference to Graph 3A.

If decision block 358 is answered in the affirmative, the A-Phase control is appropriate, and the flow diagram portion designated generally by the reference numeral 360 is executed, as indicated by the circled letter A. If the decision block 358 is answered in the negative the B-Phase control is appropriate, and the flow diagram portion designated generally by the reference numeral 362 is executed, as indicated by the circled letter B. If the decision block 356 is answered in the affirmative, the C-Phase control is appropriate, and the flow diagram portion designated generally by the reference numeral 364 is executed, as indicated by the circled letter C.

Referring now the A-Phase control and the flow diagram portion 360, the instruction block 366 is first executed to increment the elapsed shift time term SHFTME. Then, the instruction block 368 is executed to determine the pressure command P(OFG) for the off-going clutch. As indicated above in reference to the graph of FIG. 4, the off-going pressure command P(OFG) is determined as a two-dimensional function of the torque variable $T_v$ and the elapsed shift time term SHFTME.

If the elapsed time of the shift SHFTME is at least as great as the difference between SHIFT DELTA and the empirically known fill time $t_{fill}$ of the on-coming clutch, as determined at decision block 370, the instruction block 372 is executed to set the pressure command P(ONC) for the on-coming clutch equal to the transmission line pressure $P_{line}$ for initiating the fill phase of the clutch. As indicated above in reference to the graph of FIG. 5, the term SHIFT DELTA is determined as a function of the change in turbine speed for the shift. When the elapsed time of the shift SHFTME becomes at least as great as the term SHIFT DELTA, as determined at decision block 374, the on-coming clutch is filled and the instruction block 376 is executed to set P(ONC) equal to a relatively low pressure value $P_{lo}$ sufficient only to maintain the on-coming clutch in a filled condition.

Referring now to the B-Phase control and the flow diagram portion 362, the instruction block 378 is executed to determine the off-going pressure command P(OFG) as a function of the torque variable $T_v$ and the elapsed shift time term SHFTME. As indicated above in reference to FIG. 4, the time term used in scheduling P(OFG) during the B-Phase is frozen at the end of the A-Phase. Thus, the term SHFTME is not incremented during the B-Phase of the shift. As in the A-Phase, the pressure command P(ONC) for the on-coming clutch is maintained at the relatively low level $P_{lo}$ to maintain the on-coming clutch in a filled condition.

Referring now to the C-Phase control and the flow diagram portion 364, the instruction block 380 is first executed to increment the elapsed shift time term SHFTME and a separate elapsed C-Phase time term CTME. Then, the instruction blocks 382 and 384 are executed to determine the pressure commands P(ONC) and P(OFG) for the on-coming and off-going clutches. As indicated above in reference to FIG. 7, P(ONC) is determined as a function of the torque variable $T_v$ and the time in the C-Phase of the shift CTME. As indicated above in reference to FIG. 4, P(OFG) is determined according to the product of P(OFG) at the end of the B-Phase and a multiplier MULT determined as a function of the torque variable $T_v$ and the elapsed shift time SHFTME.

When the elapsed time of the C-Phase CTME exceeds the time TMAX, as determined at decision block 386, P(ONC) has been ramped to its final value. At such time, the instruction block 388 is executed to reset the SHIFT IN PROGRESS flag, completing the C-Phase and the event sequenced downshift routine.

While this invention has been described herein in reference to the illustrated embodiment, it will be understood that various modifications will occur to those skilled in the art and that systems incorporating such modifications may fall within the scope of this invention, which is defined by the appended claims.

The embodiments of the invention in which an exclusive property or privilege is claimed are defined as follows.

We claim:

1. In a motor vehicle including an engine connected to drive the vehicle through an automatic transmission, where the engine develops output torque in relation to operator demand and the transmission includes a fluid-operated torque establishing device associated with each of an upper and a lower speed ratio mechanism, which devices are selectively engageable to transmit engine torque through their respective speed ratio mechanisms, a method of operating the torque establishing devices so as to downshift the transmission from the upper speed ratio to the lower speed ratio when the downshift is needed to satisfy operator demand, said method comprising the steps of:

progressively reducing the fluid pressure supplied to the torque establishing device associated with the upper speed ratio, thereby allowing the engine to increase the transmission input speed;

suspending the progressive reduction of the fluid pressure supplied to the torque establishing device associated with the upper speed ratio when the slippage thereacross exceeds a first reference value; and progressively engaging and disengaging the torque establishing devices associated with the lower and upper speed ratio mechanisms, respectively, when the slippage across the torque establishing device associated with the lower speed ratio mechanism falls below a reference value chosen in relation to the time required for such engagement and disengagement, whereby the transmission input speed substantially achieves a post shift value at the time of such engagement and disengagement, resulting in reduced shift-related output torque disturbance.

2. The method set forth in claim 1, wherein the first reference value is chosen in relation to the transmission input speed change expected to occur during th downshift for achieving a desired level of transmission input speed acceleration.

3. The method set forth in claim 1, where the torque establishing device associated with the lower speed ratio includes engagement means which must be substantially filled with fluid before engagement of such torque establishing device can be effected, and the method additionally comprises the steps of:

initiating the filling of said engagement means in relation to the transmission input speed change expected to occur during the downshift and an estimation of the time required to fill it so that the engagement means is substantially filled prior to the required engagement of its associated torque establishing device; and reducing the pressure supplied to said engagement means upon expiration of said estimated fill time to a level sufficient to maintain said engagement means in a substantially filled condition until engagement of its associated torque establishing device is required.

4. In a motor vehicle including an engine connected to drive the vehicle through an automatic transmission, where the engine develops output torque in relation to operator demand and the transmission includes a fluid-operated torque establishing device associated with each of an upper and a lower speed ratio mechanism, which devices are selectively engageable to transmit engine torque through their respective speed ratio mechanisms, a method of operating the torque establishing devices so as to downshift the transmission from the upper speed ratio to the lower speed ratio when the downshift is needed to satisfy operator demand, said method comprising the steps of:

initiating a first mode of operation (A) for progressively reducing the fluid pressure supplied to the torque establishing device associated with the upper speed ratio when it is determined that a downshift from said upper speed ratio to the lower speed ratio is needed to satisfy operator demand, thereby allowing the engine to effect a progressive increase in the transmission input speed;

initiating a second mode of operation (B) for suspending the reduction of fluid pressure effected during said first mode of operation (A) when such reduction results in slippage across the torque establishing device in excess of predetermined reference, thereby allowing the transmission input speed to continue its progressive rate of increase; and initiating a third mode of operation (C) for progressively increasing and decreasing the fluid pressure supplied to the torque establishing devices associated with the lower and upper speed ratio mechanisms to respectively engage and disengage the lower and upper speed ratio torque establishing devices when the slippage across the lower speed ratio torque establishing device falls below a reference value chosen in relation to the time required for such engagement and disengagement, whereby the transmission input speed substantially achieves a post shift value at the time of such engagement and disengagement, resulting in reduced shift-related output torque disturbance.

5. The method set forth in claim 4, where the torque establishing device associated with the lower speed ratio includes engagement means which must be substantially filled with fluid before engagement of such torque establishing device can be effected, and the method additionally comprises the steps of:

initiating the filling of said engagement means during the first mode of operation (A) in relation to the transmission input speed change expected to occur during the downshift and an estimation of the time required to substantially fill it so that the engagement means is substantially filled prior to the required engagement of its associated torque establishing device in said third mode of operation (C); and reducing the pressure supplied to said engagement means upon expiration of said estimated fill time to a level sufficient to maintain said engagement means in a substantially filled condition until engagement of its associated torque establishing device is required.

* * * * *